United States Patent
Chetuparambil et al.

(10) Patent No.: US 9,098,600 B2
(45) Date of Patent: *Aug. 4, 2015

(54) DERIVING DYNAMIC CONSUMER DEFINED PRODUCT ATTRIBUTES FROM INPUT QUERIES

(75) Inventors: Madhu K. Chetuparambil, Raleigh, NC (US); George T. Jacob Sushil, Bangalore (IN); Kalapriya Kannan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 799 days.

This patent is subject to a terminal disclaimer.

(21) Appl. No.: 13/232,543

(22) Filed: Sep. 14, 2011

(65) Prior Publication Data

US 2013/0066912 A1    Mar. 14, 2013

(51) Int. Cl.
*G06F 17/30* (2006.01)
*G06Q 30/02* (2012.01)

(52) U.S. Cl.
CPC ...... *G06F 17/30979* (2013.01); *G06Q 30/0256* (2013.01)

(58) Field of Classification Search
CPC .............. G06F 17/30749; G06F 17/30817; G06F 17/30861; G06F 17/30979; G06F 17/30539; G06F 17/30737; G06F 17/2795; G06Q 30/0256; G06Q 10/06395; Y10S 707/99933
USPC .................. 707/776, 766, 767, 770
See application file for complete search history.

(56) References Cited

U.S. PATENT DOCUMENTS

| | | | |
|---|---|---|---|
| 6,370,513 B1 | 4/2002 | Kolawa et al. | |
| 7,734,641 B2 | 6/2010 | Kanisberg et al. | |
| 7,930,302 B2* | 4/2011 | Bandaru et al. | 707/737 |
| 8,145,662 B2* | 3/2012 | Chen et al. | 707/767 |
| 8,335,791 B1 | 12/2012 | Goldstein et al. | |
| 8,428,933 B1* | 4/2013 | Roizen et al. | 704/9 |
| 8,428,948 B1* | 4/2013 | Roizen et al. | 704/251 |
| 8,700,652 B2* | 4/2014 | Agarwal | 707/765 |
| 8,732,198 B2* | 5/2014 | Chetuparambil et al. | 707/776 |
| 2005/0228511 A1 | 10/2005 | Das et al. | |
| 2007/0011154 A1 | 1/2007 | Musgrove et al. | |
| 2007/0100796 A1 | 5/2007 | Wang | |
| 2007/0112761 A1* | 5/2007 | Xu et al. | 707/5 |
| 2008/0005086 A1* | 1/2008 | Moore | 707/3 |
| 2009/0048823 A1* | 2/2009 | Liu et al. | 704/9 |
| 2009/0063247 A1 | 3/2009 | Burgess et al. | |
| 2009/0192808 A1* | 7/2009 | Sela | 705/1 |

(Continued)

FOREIGN PATENT DOCUMENTS

WO     0155886 A2    8/2001

OTHER PUBLICATIONS

Non-Final Office Action for U.S. Appl. No. 13/421,143, mailed May 17, 2013, 10 pages, U.S. Patent and Trademark Office.

(Continued)

*Primary Examiner* — Thanh-Ha Dang
(74) *Attorney, Agent, or Firm* — Jordan IP Law, LLC (57) ABSTRACT

Methods and systems of defining product attributes may involve receiving a search query and extracting a user expectation from the search query. In addition, an attribute may be defined for a product based on the user expectation. In one example, consumer generated content such as forum content, review content, blog content and social networking content, is used to define the attribute.

11 Claims, 5 Drawing Sheets

(56) References Cited

U.S. PATENT DOCUMENTS

| | | | |
|---|---|---|---|
| 2009/0276377 | A1 | 11/2009 | Dutta et al. |
| 2009/0307054 | A1* | 12/2009 | D'Imporzano et al. ......... 705/10 |
| 2010/0057802 | A1* | 3/2010 | McKeeth ....................... 707/734 |
| 2010/0241507 | A1 | 9/2010 | Quinn et al. |
| 2010/0250558 | A1 | 9/2010 | Wang |
| 2010/0269050 | A1 | 10/2010 | Kirkby et al. |
| 2010/0306123 | A1 | 12/2010 | Cai et al. |
| 2011/0022562 | A1 | 1/2011 | Gopisetty et al. |
| 2011/0145285 | A1 | 6/2011 | Gustafson et al. |
| 2011/0153663 | A1 | 6/2011 | Koren et al. |
| 2011/0320373 | A1* | 12/2011 | Lee et al. ...................... 705/319 |
| 2012/0191717 | A1 | 7/2012 | Chen et al. |
| 2013/0031089 | A1* | 1/2013 | Allen et al. ................... 707/723 |
| 2014/0122300 | A1* | 5/2014 | Gonsalves et al. ......... 705/26.62 |

OTHER PUBLICATIONS

Alshabib, et al., Deriving Ratings through Social Network Structures, Abstract, First International Conference on Availability, Reliability and Security (ARES'06), Apr. 20, 2006, http://doi.ieeecomputersociety.org/10.1109/ARES.2006.50.

Lee, et al., Needs-Centric Searching and Ranking Based on Customer Reviews, The Wharton School, University of Pennsylvania, pp. 1-10, http://opim.wharton.upenn.edu/~thomasyl/LeeT NeedsRanking.pdf. Retrieved May 13, 2011.

Non-Final Office Action for U.S. Appl. No. 13/421,143, mailed Nov. 2, 2012, 14 pages, U.S. Patent and Trademark Office.

Kaisa Vaananen-Vainio-Mattila et al., Now Let's Do it in Practice: User Experience Evaluation Methods in Product Development, CHI 2008 Proceedings—Workshops, Apr. 5-10, 2008, pp. 3961-3964, Florence, Italy.

Yelena Nakhimovsky et al., Mobile User Experience Research: Challenges, Methods and Tools, CHI 2009—Workshops, Apr. 4-9, 2009, pp. 4795-4798, Boston, MA.

Janyce M. Wiebe, Learning Subjective Adjectives from Corpora, Department of Computer Science—New Mexico State University, 6 pages, Las Cruces, NM.

Sreenivasa P Sista et al., Polarized Lexicon for Review Classification, Applied Research Group—Satyam Computer Services Limited, 6 pages, Bangalore, India.

Effie L-C. Law et al., Understanding, Scoping and Defining User eXperience: A Survey Approach, Proceedings of Human Factors in Computing Systems, 2009, pp. 719-728, 10 pages.

Marianna Obrist et al., User Experience Evaluation—Do You Know Which Method to Use?, CHI 2009—Special Interest Groups, Apr. 4-9, 2009, pp. 2763-2766, Boston, MA.

\* cited by examiner

DERIVING DYNAMIC CONSUMER DEFINED PRODUCT ATTRIBUTES FROM INPUT QUERIES

BACKGROUND

Embodiments of the present invention generally relate to online shopping. More particularly, embodiments relate to the use of search queries to define product attributes in electronic commerce (e-commerce) platforms.

A typical online shopping experience may involve a consumer conducting various searches on manufacturer or retailer web sites to identify products of interest. If the consumer's search terms match the information used in a particular product description, then that product might be included in the search results presented to the consumer. Because the product descriptions may often be generated, however, by the manufacturer or retailer there may be instances in which consumer expectations are not fully captured in the information being searched. Accordingly, there may be significant room for improvement with regard to providing consumers an accurate and fast mechanism to identify products of interest.

BRIEF SUMMARY

Embodiments may provide for a computer implemented method in which a search query is received and a user expectation is extracted from the search query. The method may also provide for defining an attribute for a product based on the user expectation.

Embodiments may also include a computer program product having a computer readable storage medium and computer usable code stored on the computer readable storage medium. If executed by a processor, the computer usable code can cause a computer to receive a search query and extract a user expectation from the search query. The computer usable code may also cause a computer to define an attribute for a product based on the user expectation.

Other embodiments may include a computer implemented method in which a search query is received and one or more nouns in the search query are distinguished from a product in the search query. The method can also provide for identifying one or more synonyms associated with the one or more nouns, and extracting a user expectation from the search query based on the one or more nouns and the one or more synonyms. Consumer generated content can be mined for the user expectation, and an occurrence frequency of the user expectation in the consumer generated content may be determined. In addition, the method may involve generating an attribute for the product based on the user expectation if the occurrence frequency exceeds a threshold and the attribute is not present in a product catalog. Moreover, metadata may be added to the attribute, wherein the metadata includes at least one of occurrence frequency data and opinion data. The method can also include adding the attribute to the product catalog, conducting a search of the product catalog based on the search query, and generating a result based on the search.

Embodiments may also include a computer program product having a computer readable storage medium and computer usable code stored on the computer readable storage medium. If executed by a processor, the computer usable code can cause a computer to receive a search query, and distinguish one or more nouns in the search query from a product in the search query. The computer usable code may also cause a computer to identify one or more synonyms associated with the one or more nouns. In addition, the computer usable code can cause a computer to extract a user expectation from the search query based on the one or more nouns and the one or more synonyms, and mine consumer generated content for the user expectation. The computer usable code may also cause a computer to generate an attribute for the product based on the user expectation if the occurrence frequency exceeds a threshold and the attribute is not present in a product catalog. In addition, the computer usable code may cause a computer to add metadata to the attribute, wherein the metadata is to include at least one of occurrence frequency data and opinion data, and add the attribute to the product catalog. The computer usable code can also cause a computer to conduct a search of the product catalog based on the search query, and generate a result based on the search.

Embodiments may also include a computer program product comprising a computer readable storage medium and computer usable code stored on the computer readable storage medium. If executed by a processor, the computer usable code may cause a computer to receive a search query and filter consumer generated content based on the search query to obtain one or more matching products. The computer usable code may also cause a computer to rate the one or more matching products based on one or more opinions expressed in the consumer generated content.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
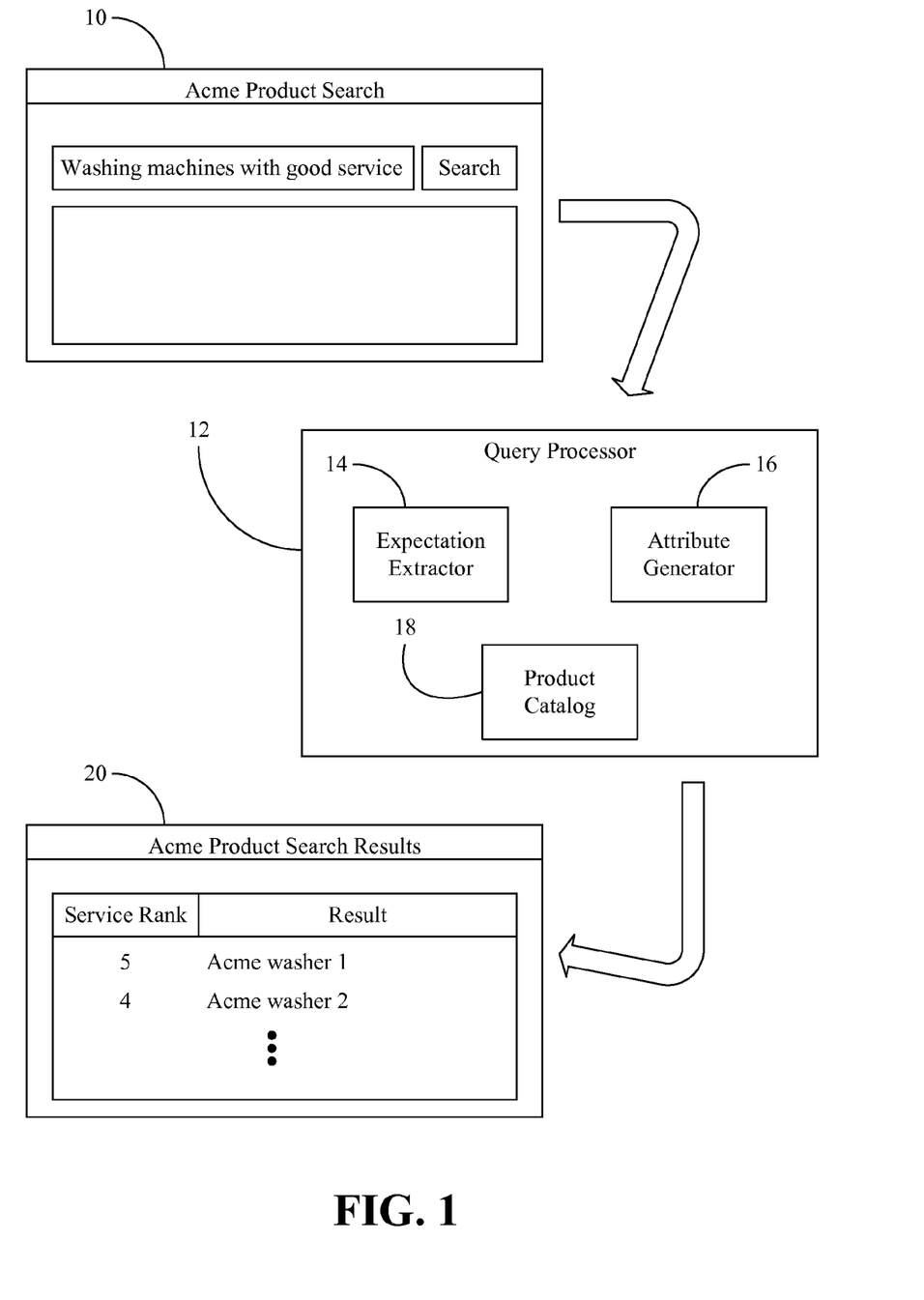
FIG. 1 is a block diagram of an example of a scheme of dynamically deriving consumer defined product attributes from search queries according to an embodiment.

Referring now to FIG. 1, a scheme of dynamically deriving user defined product attributes from input queries is shown. In particular, the scheme may include a product search page 10 used by consumers to find products of interest, wherein the search page 10 could be associated with the web site of a manufacturer (e.g., "Acme"), a retailer, and so forth. Thus, the search page 10 might be retrieved from a manufacturer's web server and displayed in a web browser running on user equipment such as a personal computer (PC), laptop, or handheld device. Example browsers include, but are not limited to, Firefox and/or Firefox Mobile from Mozilla, Internet Explorer and/or Internet Explorer for Mobile from Microsoft, other device-specific proprietary browsers (e.g., Apple iPhone web browser), etc.

In the illustrated example, a query processor 12 is used to enhance search results 20 returned to consumers in response to search queries entered via the product search page 10. In particular, the query processor 12 may include an expectation extractor 14 to receive the search queries and extract user expectations from the search queries. As will be discussed in greater detail, the extraction of user expectations may involve the use of various tools such as synonym repositories, industry-specific knowledge bases, etc. In addition, an attribute generator 16 may dynamically define attributes for products based on the user expectations, wherein the defined attributes may be added to a product catalog 18. The updated product catalog 18 can be used to generate the product search results 20 for both the user associated with the source search query as well as other/subsequent users.

The user defined attributes thus obtained can be further used as filters for obtaining search results. Typically, when a search query is presented to a search engine, the search engine may navigate one or more product catalogs to obtain products that match the query. The user defined attributes described herein, along with one or more "sentiment keywords", can be used to search the user generated content for specific products that match the sentiment of the user defined attribute. Thus, the user defined attributes can be used to reverse the traditional approach of first using search queries to filter the products. Rather, the illustrated approach provides the searched information (e.g. sentiment keyword) at the end of the navigation process to consumers. Ratings can also be provided for the products that match the search query.

For example, a user might enter the text "Washing machines with good service" into the product search page 10 as a search query, as shown. In such a case, the expectation extractor 14 might parse the entered text to identify "washing machines" as a product and "service" as an expectation with respect to that product. In this regard, the manufacturer (e.g., "Acme") may not have considered service as a washing machine expectation that is important to its customers. For example, traditional specifications such as physical dimensions, color and cycle types might be a primary focus of the manufacturer for the product in question, whereas more subjective considerations that are important to the end user could be difficult for the manufacturer to ascertain without explicit and costly consumer survey information. Accordingly, in the example shown, the washing machine product descriptions in the product catalog 18 might not include service as a metric that is either searchable or viewable on a product-by-product basis.

The illustrated attribute generator 16, however, is able to dynamically define "service" as an attribute for the product "washing machines", and add the dynamically defined service attribute to the product catalog 18. Moreover, the attribute generator 16 may populate the service attribute for various washing machines offered by the manufacturer. In one example, the population is accomplished in the form of metadata that can be created based on consumer generated content such as forum content, blog content and social networking content, wherein the metadata is dynamically added to the attribute. As will be discussed in greater detail, the relevant consumer generated content may be validated against an occurrence frequency threshold to ensure an acceptable level of confidence in the generated attribute. In addition, the generated attribute and initial search query may be validated against one or more sentiment rules that enable the proper meaning and/or context to be gleaned from the initial search query.

Thus, it might be determined from the consumer generated content that consumers generally consider "Acme washer 1" to be slightly better than "Acme washer 2" with respect to service. Accordingly, a higher service rank can be assigned to Acme washer 1 than Acme washer 2 in the product search results 20, as shown in the illustrated the example. The illustrated approach therefore provides the initiating user as well as subsequent users of the product search page 10 with more accurate results. Moreover, users may be able to find products that match their expectations more quickly, and may be more likely to make purchases from the manufacturers and/or retailers deploying the query processor 12.

Figure 2:
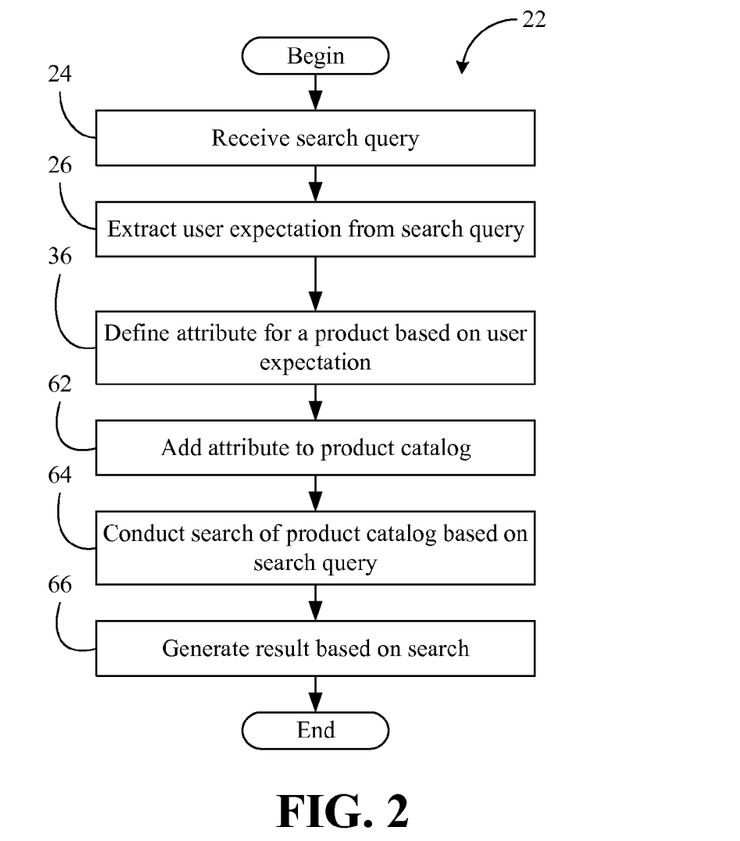
FIG. 2 is a flowchart of an example of a method of dynamically deriving consumer defined product attributes from search queries according to an embodiment.

FIG. 2 shows a method 22 of dynamically deriving consumer defined product attributes from input queries. The method 22 might be implemented in, for example, a query processor such as query processor 12 (FIG. 1) or other suitable computing system component. Illustrated processing block 24 receives a search query, wherein a user expectation may be extracted from the search query at block 26, and an attribute may be defined for a product based on the extracted user expectation at block 36.

Figure 3:
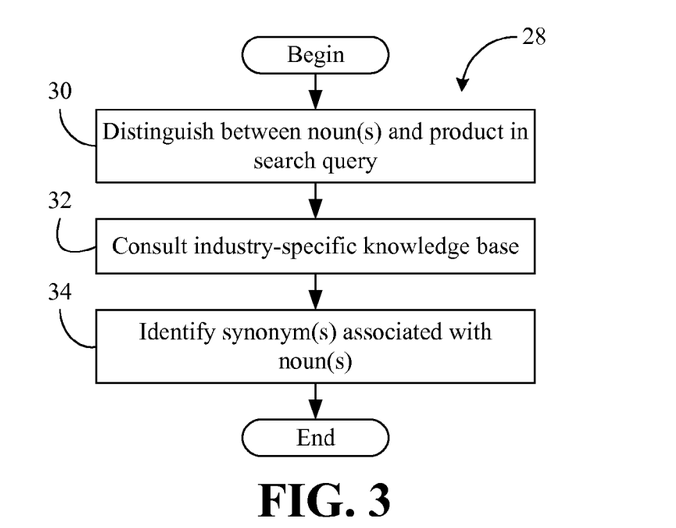
FIG. 3 is a flowchart of an example of a method of extracting user expectations from search queries according to an embodiment.

Turning now to FIG. 3, one approach to extracting a user expectation from a search query is shown in method 28. In particular, illustrated block 30 distinguishes between one or more nouns and a product in the search query. For example, in the scenario discussed above, block 30 might distinguish between "machines" and "service" in the text string "Washing machines with good service", wherein machines may be identified as the product. Block 30 may also provide for the identification of intensifiers such as "good" in the example shown. An industry-specific knowledge base or other ontology based repository can be consulted at block 32, and one or more synonyms associated with the aforementioned nouns may be identified at block 34. For example, the industry-specific knowledge base could indicate that the synonym "washer" and/or the noun phrase "washing machines" are meaningful products in the field of consumer appliances. In addition, the industry-specific knowledge based and/or a thesaurus database might flag synonyms such as "support", "fix" or "repair" as being relevant synonyms for "service" in the context of washing machines. Simply put, the identified nouns/noun phrases, their synonyms, as well as the identified intensifiers may constitute a user expectation with regard to the identified product.

Figure 4:
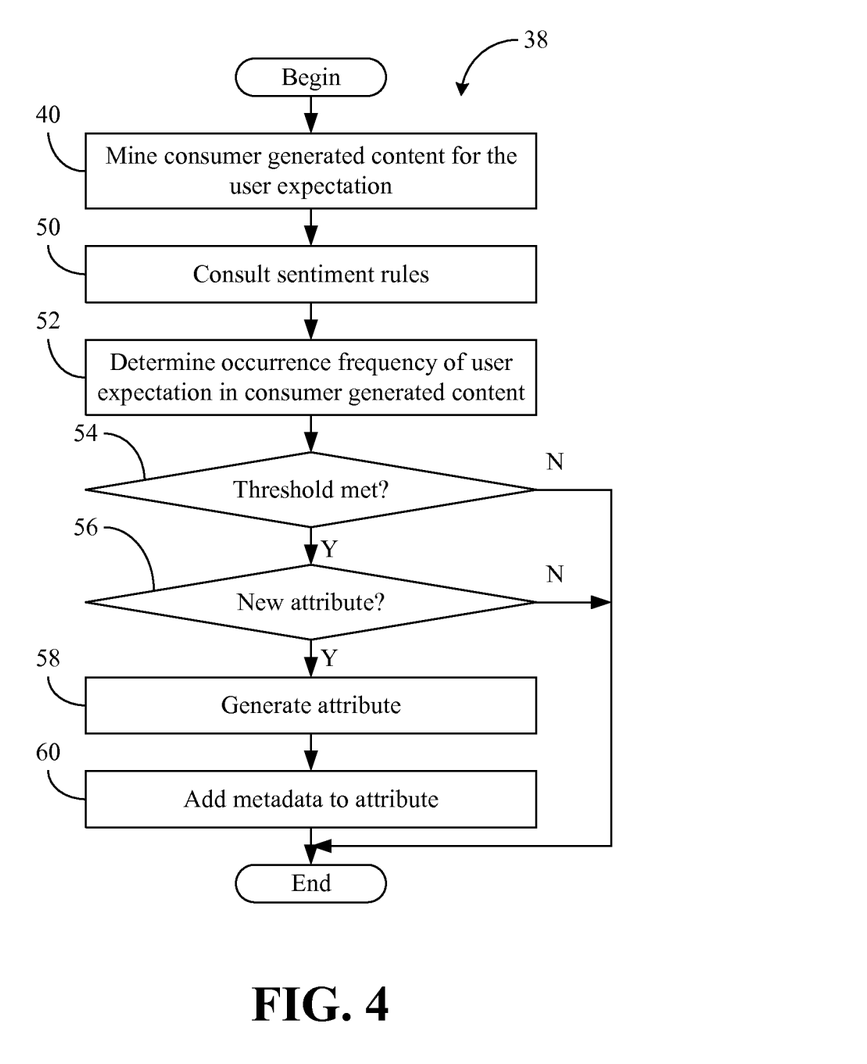
FIG. 4 is a flowchart of an example of a method of defining attributes for a product based on user expectations according to an embodiment.

FIG. 4 shows one approach to defining an attribute for a product in method 38. In particular, illustrated block 40 mines consumer generated content for the extracted user expectation. In this regard, the consumer generated content can include non-traditional sources of product attributes such as online forums, reviews, blogs and social networking sites. The mining process may be conducted offline, on a periodic basis and/or on demand depending upon the circumstances.

Figure 5A:
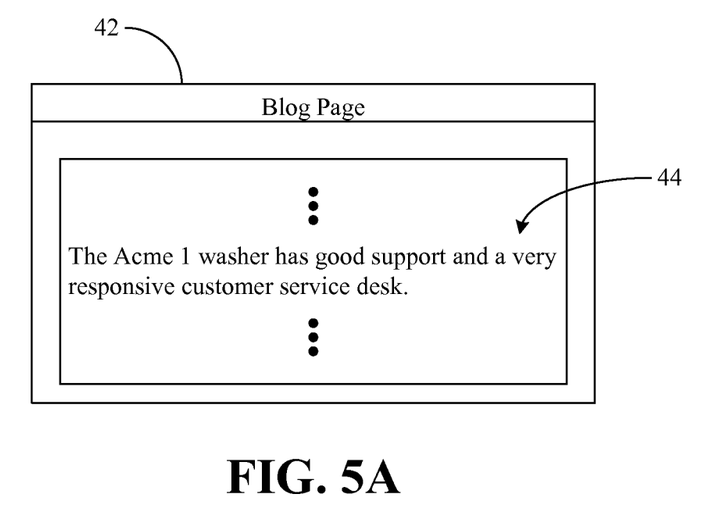
FIGS. 5A and 5B are block diagrams of examples of consumer generated content according to an embodiment.
Figure 5B:
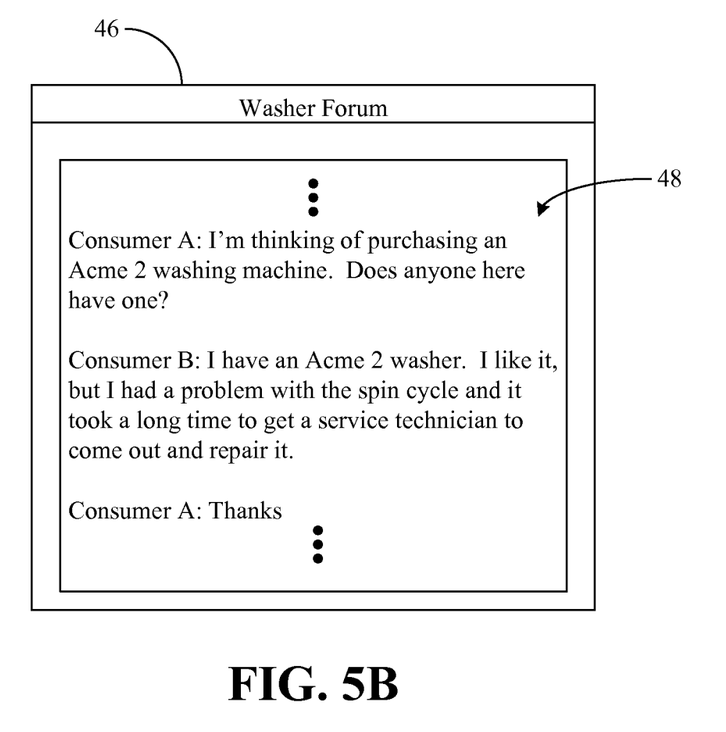

FIGS. 5A and 5B demonstrate that relevant information may be obtained from a wide variety of sources. For example, FIG. 5A shows a blog page 42 having blog content 44 that mentions an attribute ("service") in the context of a particular product ("Acme 1 washer"). The block page 42 could be associated with (e.g., hosted by) the manufacturer/retailer corresponding to the product or a separate web site, wherein the mining process may detect the blog content 44 and process it for relevance to the initial product search query. FIG. 5B shows a forum page 46 having forum content 48 that mentions an attribute ("service") as well as a synonym ("repair") of that attribute in the context of another particular product ("Acme 2 washing machine"). Similarly, the mining process can detect the forum content 48 and process it for relevance to the initial product search query.

Returning to FIG. 4, one or more sentiment rules may be consulted at block 50, wherein the sentiment rules can enable a determination of the relevance of the mined consumer generated content to the initial search query. Thus, the sentiment rules might provide for disregarding certain content even though it may contain some of all of the user expectation text because the content does not contain the correct contextual information (e.g., "service" in the context of fast food restaurants, or "washer" in the context of bolts/screws). Block 52 provides for determining an occurrence frequency of the product and/or user expectation in the consumer generated content. Generally, the occurrence frequency can ensure a certain level of confidence in the mined data. Moreover, the sentiment rule analysis may be particularly useful in the occurrence frequency analysis, since certain mining results could constitute "false positives" in the overall context of the initial search query.

If it is determined at block 54 that the occurrence frequency exceeds a certain threshold, a determination may be made at block 56 as to whether a product catalog such as catalog 18 (FIG. 1) already contains an attribute that reflects the underlying user expectation. If not, illustrated block 58 generates a new product attribute based on the user expectation. Thus, in the example above, an attribute of "service" for the product "washing machines" might be created at block 58. In addition, metadata may be added to the attribute at block 60, wherein the metadata includes data such as occurrence frequency data, opinion data, and so forth. Thus, in the example above, metadata reflecting how often a particular opinion (e.g., "good support") about the service of "Acme 1 washer" was encountered during the mining process could be added to the service attribute. Similarly, metadata reflecting how often another opinion (e.g., "long time to get a service technician") about the service of "Acme 2 washer" was encountered during the mining process may also be added to the service attribute.

Returning now to FIG. 2, illustrated block 62 adds the dynamically generated attribute to the product catalog, and a search of the product catalog may be conducted at block 64 based on the search query. One or more results such as search results 20 (FIG. 1) may be generated at block 66.

Figure 6:
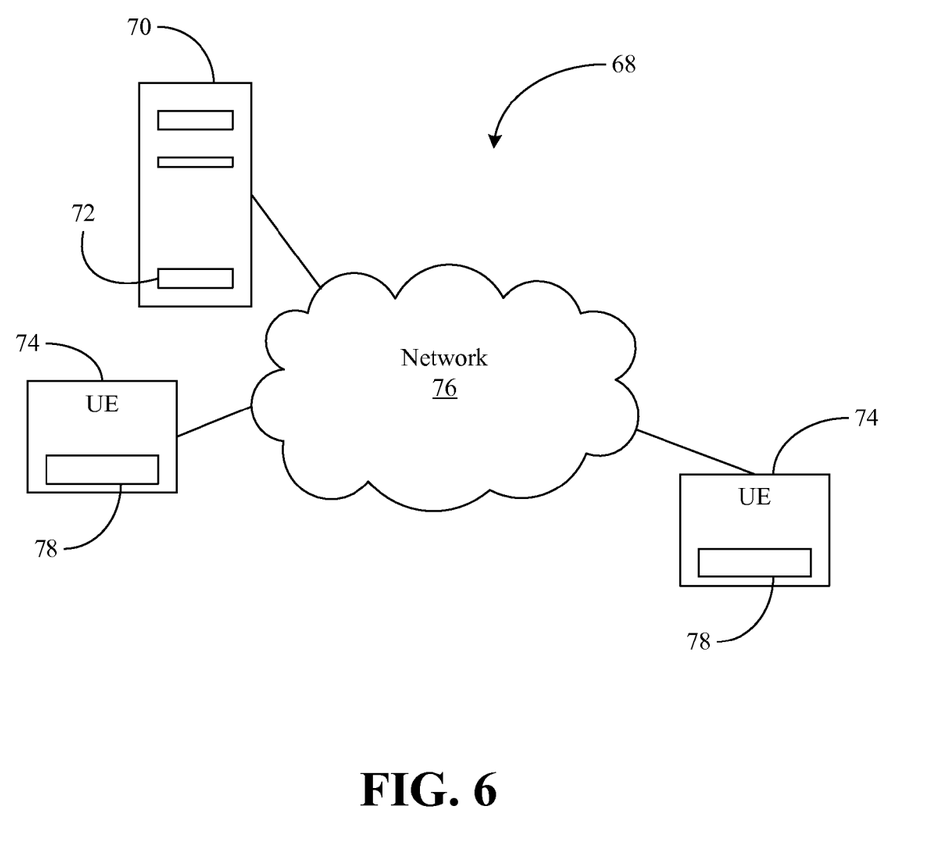
FIG. 6 is a block diagram of an example of a networking architecture according to an embodiment.

FIG. 6 shows a networking architecture 68 in which a server 70 might support a wide variety of e-commerce transactions and activities, and may include distributed and/or redundant web-based servers that are able to respond to web page requests for content. Thus, the server 70 can have stored thereon hypertext markup language (HTML) and other markup language-encoded content, as well as databases and applications such as Java and other applications. In the illustrated example, the server 70 is connected to one or more user equipment (UE) devices 74 via a network 76, wherein the UE devices 74 may include browsers 78 capable of issuing web page requests to the server 70 over the network 76. The network 76 can itself include any suitable combination of servers, access points, routers, base stations, mobile switching centers, public switching telephone network (PSTN) components, etc., to facilitate communication between the UE devices 74 and the server 70.

The illustrated server 70 also includes a query processor 72 configured to receive search queries from the UE devices 74, extract user expectations from the search queries, and dynamically define attributes for products based on the user expectations. The query processor 72 may also be configured to add the defined attributes to a product catalog such as catalog 18 (FIG. 1), and use the updated product catalog to generate product search results. The query processor 12 (FIG. 1) may be readily substituted for the illustrated query processor 72.

Thus, techniques described herein enable manufacturers/retailers to support opinion searches on specific customer derived attributes, understand customer requirements for products, realign marketing strategies according to customer requirements, and so forth. In addition, consumers may be able to search for products by derived attributes that are not typically provided by manufacturers/retailers, increase confidence in their purchasing decisions, and be exposed to features that are not typically available.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer program product comprising:
    a non-transitory computer readable storage medium; and
    computer usable code stored on the non-transitory computer readable storage medium, where, if executed by a processor, the computer usable code causes a computer to:
    receive a search query;
    distinguish one or more nouns in the search query from a product in the search query;
    identify one or more synonyms associated with the one or more nouns;
    extract a user expectation from the search query based on the one or more nouns and the one or more synonyms;
    mine consumer generated content for at least one of the product and the user expectation;
    determine an occurrence frequency of at least one of the product and the user expectation in the consumer generated content;
    generate an attribute for the product based on the user expectation if the occurrence frequency exceeds a threshold and the attribute is not present in a product catalog;
    add metadata to the attribute, wherein the metadata is to include at least one of occurrence frequency data and opinion data;
    add the attribute to the product catalog;
    conduct a search of the product catalog based on the search query; and
    generate a result based on the search.

2. The computer program product of claim 1, wherein at least one of forum content, review content, blog content and social networking content is to be mined for the user expectation.

3. The computer program product of claim 1, wherein, if executed by a processor, the computer program product causes a computer to consult one or more sentiment rules to determine the occurrence frequency.

4. The computer program product of claim 1, wherein if executed by a processor, the computer program product causes a computer to consult an industry-specific knowledge base to extract the user expectation.

5. A computer program product comprising:
    a non-transitory computer readable storage medium; and
    computer usable code stored on the non-transitory computer readable storage medium, where, if executed by a processor, the computer usable code causes a computer to:
    receive a search query;
    extract a user expectation from the search query;
    mine consumer generated content for at least one of a product and the user expectation;
    determine an occurrence frequency of at least one of the product and the user expectation in the consumer generated content; and
    generate an attribute for the product based on the user expectation if the occurrence frequency exceeds a threshold and the attribute is not present in a product catalog.

6. The computer program product of claim 5, wherein, if executed by a processor, the computer usable code causes a computer to add metadata to the attribute, wherein the metadata includes at least one of occurrence frequency data and opinion data.

7. The computer program product of claim 5, wherein at least one of forum content, review content, blog content and social networking content is to be mined for the user expectation.

8. The computer program product of claim 5, wherein, if executed by a processor, the computer usable code causes a computer to:
   add the attribute to the product catalog;
   conduct a search of the product catalog based on the search query; and
   generate a result based on the search.

9. The computer program product of claim 5, wherein, if executed by a processor, the computer usable code causes a computer to consult one or more sentiment rules to determine the occurrence frequency.

10. The computer program product of claim 5, wherein, if executed by a processor, the computer usable code causes a computer to:
    distinguish one or more nouns in the search query from the product; and
    identify one or more synonyms associated with the one or more nouns.

11. The computer program product of claim 5, wherein, if executed by a processor, the computer usable code consults an industry-specific knowledge base to extract the user expectation.

* * * * *